United States Patent Office 2,759,635
Patented Aug. 21, 1956

2,759,635

TIRE PUNCTURE REPAIR CAPSULE

Ralph K. Boyer, Cleveland, Ohio, assignor to The Dill Manufacturing Company, Cleveland, Ohio, a corporation of Ohio Application August 4, 1953, Serial No. 372,357

1 Claim. (Cl. 222—92)

The present invention relates to a device for use in connection with making a puncture repair upon a tubeless vehicle tire.

The conventional way at present employed in connection with repairing a puncture on a tubeless tire is to use a gun similar to the ordinary grease gun (which, as is well-known, is capable of developing high pressure when operated) in the interior of which gun is a suitable rubber composition or cement, position the spout of the gun against the portion of the tire where the puncture occurs and then by operating the gun force the rubber-like material into the wound in the tire. These guns are somewhat unwieldly and not at all convenient for a motorist to carry along as a tool, and consequently essentially speaking they are only found in service stations.

In making the necessary repair, the use of these guns is rather difficult unless the wheel with the tire thereon is removed from the vehicle thus facilitating the application and operation of the gun.

The object of the present invention is to provide a capsule made preferably of metal, the gauge of which is such as to be crushable under considerable pressure, the said capsule containing a rubber composition or cement. The capsule is provided with a hollow tapered nozzle having annular ribs or threads upon its outer surface so that it may be screwed into the puncture hole and then the vehicle moved so as to, as it were, run over the capsule, crushing the capsule and forcing the cement or rubber composition into the punctured hole in the tire.

Reference should be had to the accompanying drawing, in which.

Figure 1:
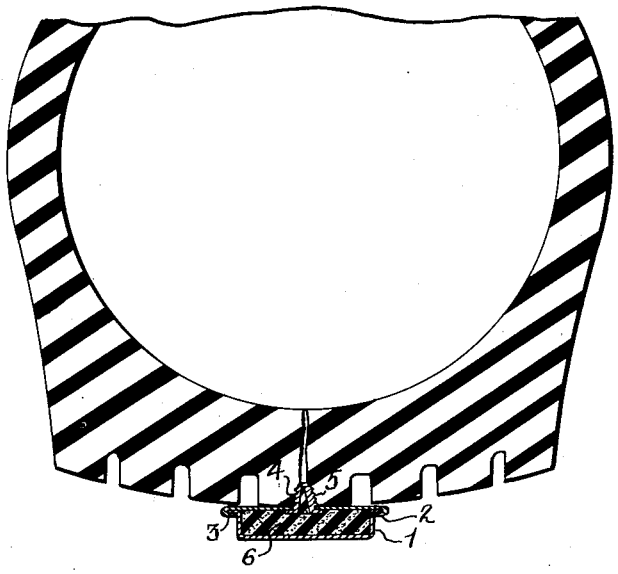
Fig. 1 shows a section taken on the line 1—1 of Fig. 2, of a tubeless tire and indicating a puncture hole and showing in cross section the capsule for making the repair.
Figure 2:
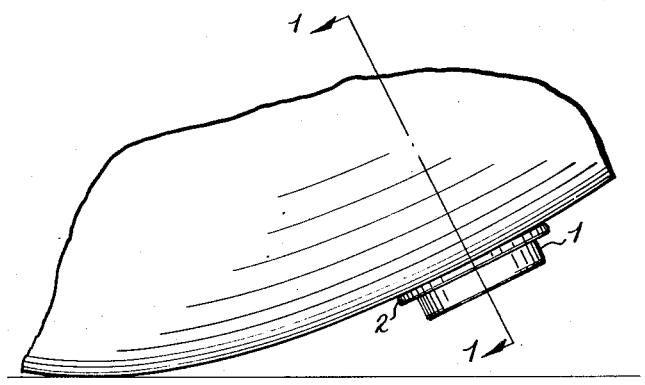
Fig. 2 is a side elevation of a tubeless tire with the repair capsule secured thereon.
Figure 3:
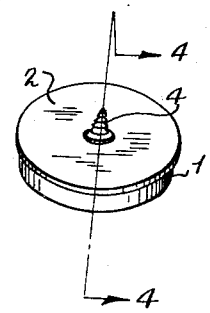
Fig. 3 is a perspective view showing the repair capsule.
Figure 4:
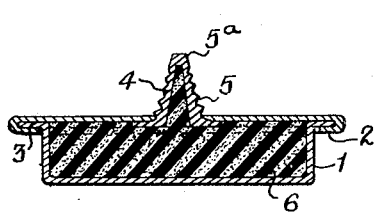
Fig. 4 is a section upon the line 4—4 of Fig. 3.

The repair capsule consists of a hollow receptacle 1 having thin walls, preferably of sheet metal to which is attached a cover 2. As shown in the drawing, the side walls of the body 1 are provided with an outwardly extending flange 3 and the cover member 2 is at its periphery crimped around the flange 3.

Mounted in the cover 2 is a nozzle 4 which is of tapered shape and upon its outer surface is provided with ridges or threads 5. The nozzle 4 is hollow and the outer end of the nozzle is closed by means of a soft metal nose as indicated at 5a which when the device is used may be removed by cutting the same with a knife or other suitable instrument.

The interior of the receptacle 1 is filled with a rubber repair composition as indicated at 6. Such composition being the same as that which is now customarily used in connection with puncture repair for tires and no novelty is claimed therefor.

The receptacle 1 is made of material which is crushable under the weight of a vehicle so that when used in the manner about to be described it will accomplish the intended function. Vehicles or cars using tubeless tires are of considerable weight and even small so-called light cars weigh well in excess of a ton.

Assuming a puncture has occurred in a tubeless tire mounted on a vehicle, the vehicle will, of course, be brought to a stop and that portion of the machine adjacent the tire in question may be jacked up so that the tire may be turned, until the punctured portion is visible and the nail or other puncturing article may be withdrawn.

The capsule which has heretofore been described, with the soft metal nose thereof removed, is introduced into the puncture hole and rotated so that the nozzle 4 is screwed into the hole in the tire. This will secure the capsule to the tire.

The jack is then manipulated to lower the tire to the ground and the car is moved either forward or backward so that the capsule on the tire will come into contact with the ground and as it were be run over by the tire. The weight of the vehicle will cause the walls of the capsule to be crushed and the contents of the capsule forced through the nozzle 4 and into the punctured opening in the tire. The car may be moved again so as to bring the crushed capsule from beneath the tire, in which position the flattened capsule may be removed by unscrewing it from its connection or mounting upon the tire.

Obviously, if when the vehicle is brought to a stop, the portion of the tire where the puncture has occurred, is conveniently positioned it will not be necessary to jack up the wheel and tire.

The capsule will be relatively small in size, the requisite size being only such as to enclose a sufficient amount of rubber composition which when forced into the punctured portion of the tire will effect the repair.

The capsule and its use herein described makes unnecessary the use of a forcing gun nor does the use of it necessitate or require for convenience, the removal from the vehicle of the wheel with the injured tire.

Having thus described my invention, I claim:

A tubeless tire repair capsule comprising a box, the bottom and side walls of which are rigid, a rigid cover secured to the side walls, the box being non-collapsible but crushable under weight of a vehicle, a hollow pointed nozzle attached to the cover and extending outwardly therefrom, said nozzle being provided in conical shape for retaining the nozzle in a puncture of a tire when the capsule is applied thereto, a viscous rubber composition in said container, the said composition being extruded through the nozzle and into the puncture of the tire when the weight of the vehicle to which the tire is attached is applied against the capsule.

References Cited in the file of this patent

UNITED STATES PATENTS

| 1,409,544 | Hallock | Mar. 14, 1922 |
| 1,575,567 | Geake | Mar. 2, 1926 |
| 1,751,341 | Leisse | Mar. 18, 1930 |
| 1,891,826 | McGinnis | Dec. 20, 1932 |
| 2,646,707 | Notz | July 28, 1953 |

FOREIGN PATENTS

| 429,108 | France | Sept. 15, 1911 |